W. COX.
FARE BOX.
APPLICATION FILED DEC. 5, 1919.

1,365,818.

Patented Jan. 18, 1921.

William Cox
per Chas St Riches
attorney

UNITED STATES PATENT OFFICE.

WILLIAM COX, OF TORONTO, ONTARIO, CANADA.

FARE-BOX.

1,365,818.  Specification of Letters Patent.  Patented Jan. 18, 1921.

Application filed December 5, 1919. Serial No. 342,617.

*To all whom it may concern:*

Be it known that I, WILLIAM COX, of the city of Toronto, in the county of York and Province of Ontario, Dominion of Canada, have invented certain new and useful Improvements in Fare-Boxes; and I hereby declare that the following is a full, clear, and exact description of same.

My invention relates to a fare box, operating on the principle of that shown and described in Letters Patent of the United States No. 1135264, dated April 13th, 1915, and comprising three necessary parts viz:—
an examining chamber, in which the fares are deposited and retained for inspection; a storage chamber to which the fares are delivered from the examining chamber; and a trap, which retains the fares in the examining chamber during the inspection period, permits of their delivery to the storage chamber, and prevents their return from the storage chamber to the examining chamber after having been deposited therein.

One of the objects of the invention is to so construct the trap that it will positively and instantaneously operate to attain these ends under all conditions of use and manipulation.

In carrying out this object, the trap is constructed with two sets of pivoted idlers to normally close the communication between the examining chamber and the storage chamber, and a pivoted baffle for each set of idlers, to instantaneously effect and maintain the closed relation of all the idlers of each set, except during the delivery of the fares from the examining chamber to the storage chamber, and a shutter to cover one baffle and both sets of idlers, and engage the other baffle when the fare box is inverted or partly so.

A further object of the invention is to provide this trap with a movable platform which will automatically adapt itself to the conditions governing the fare inspection in the examining chamber, and the delivery of the fares therefrom to the storage chamber.

For an understanding of the invention, reference is to be had to the following description and to the accompanying drawings in which the trap is described and shown in connection with a pay-as-you-enter fare box.

In the drawings;—

Figure 1:
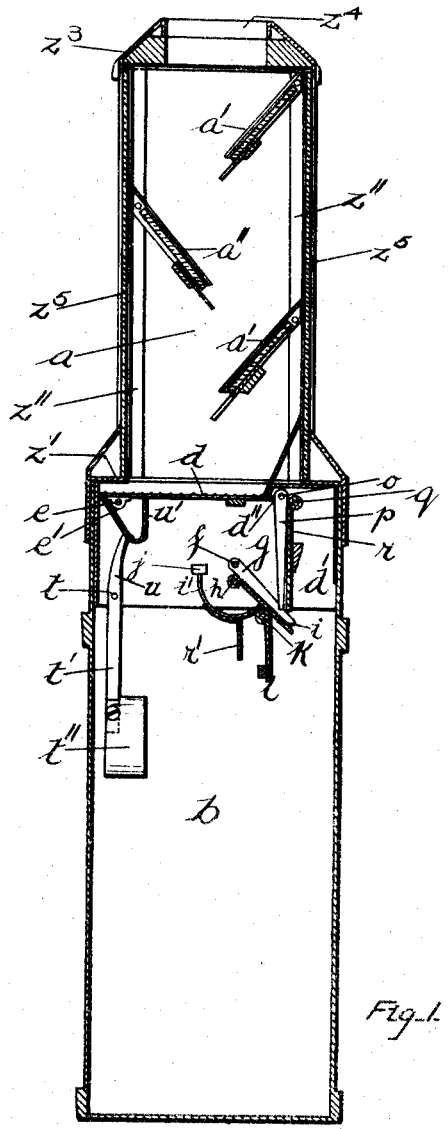
Figure 1, is a sectional elevational view, showing the location and arrangement of the parts when the fare box is in an upright or fare receiving position.

The examining chamber $a$ as shown in the drawings, is of the hopper type, consisting of a skeleton base $z'$, standards $z''$, a top $z^3$ having a fare receiving opening $z^4$ therein, and transparent sides $z^5$; the standards being employed to hold these parts together.

Within the chamber $a$ are downwardly inclined baffles $a'$, $a''$, located on opposite sides of the examining chamber to form a staggered path for the fares during their passage to the trap, which forms the division between the examining chamber and storage chamber $b$, the free edges of these baffles being serrated to prevent or, at least impede the extraction of the fares from the examining chamber, should an attempt be made to do so.

The examining and storage chambers may, however, be similar to those of the fare box shown and described in said patent.

The trap, which constitutes the essential feature of the present invention, comprises a platform $d$, which extends partly across the examining chamber, and below the platform, a shaft $f$ upon which is loosely mounted a set of spaced idlers $g$ of suitable length to extend beyond the free edge $d''$ of the platform, and partly across the interval $d'$ between the free edge of the platform and the adjacent upright side of the examining chamber, this interval forming the communication between the examining and storage chambers.

Below the platform $d$ is a second shaft $h$, upon which is mounted a rocking baffle or plate $i$, extending beneath the idlers $g$ and supporting them in their normal position. Secured to the plate $i$ is an abutment $i'$, which engages a stationary stop $j$ and arrests the supporting plate $i$, when it has reached the limit of its downward movement, to insure the spaced idlers $g$ being maintained in their correct position across said passage, when the fare box is in the position shown in either Fig. 1 or 2. The abutment $i'$ is shown in the drawings to be of a curved formation and integral with the supporting plate $i$, but it may take any other form suitable for the purpose and other means within the scope of the appended claims may be substituted for the stop $j$.

Carried by the plate $i$ is a shaft $k$, this shaft being located approximately midway between the free edge of the plate and the shaft $h$. Suspended from the shaft $k$ is a swinging shutter $l$, which causes the plate $i$ to oscillate downward until the abutment $i'$ comes into contact with the stop $j$, the spaced idlers then assuming a downwardly inclined direction. This shutter and the plate $i$ form a double baffle which operates, as hereinafter described, to prevent the return of the contents of the storage chamber to the examining chamber should the fare box be inverted, or partly so.

Mounted in the storage chamber $b$, above the spaced idlers $g$, is a shaft $o$, and on this shaft is a set of spaced idlers $p$, which hang therefrom so that they will interlap with the spaced idlers $g$, except when the fare box is tilted for the delivery of the contents of the examining chamber to the storage chamber.

At the back of the idlers $p$ is a shaft $q$, from which is suspended a swinging baffle $r$, for their collective action when changing their position with relation to the idlers $g$.

When the fare box is in an upright position, the baffle $r$, and the idlers $p$ hang vertically from their respective shafts with the idlers $p$ interlapping with the idlers $g$, for the closing of the passage from the examining chamber to the storage chamber.

Figure 2:
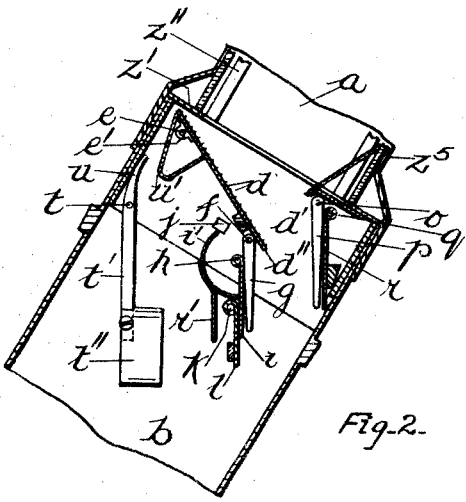
Fig. 2, is a fragmentary view, similar to Fig. 1, showing the location and arrangement of the parts when the fare box is tilted for the delivery of the fares from the examining chamber to the storage chamber.

When the fare box is tilted from the upright position shown in Fig. 1, to the inclined position shown in Fig. 2, the baffle $r$ and the idlers $p$ swing away from the idlers $g$ for the opening of the passage from the examining chamber to the storage chamber, the baffle $i$ and idlers $g$ during this movement remaining stationary or substantially so. When the fare box is restored again to its upright position the baffle $r$ and idlers $p$ move back to their normal position and the idlers $p$ then interlap with the idlers $g$.

When the fare box is tilted to the inclined position the shutter $l$ has a tendency to swing in the direction of the platform $d$, and to limit this swinging movement, the abutment $i'$ is provided with a projection or stop $r'$ to engage the shutter $l$.

Figure 3:
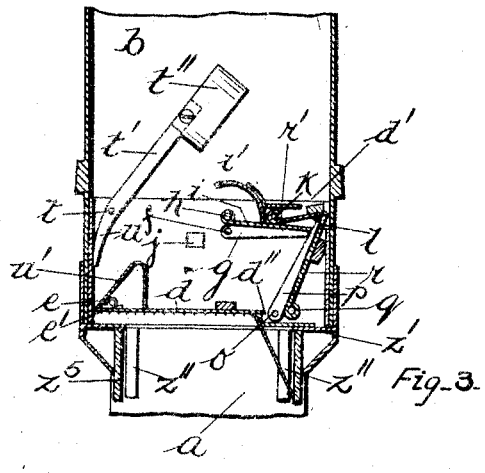
Fig. 3, is a similar view to Fig. 2, showing the position of the parts when the fare box is inverted, or partly so.

When the fare box is inverted the idlers $p$ and $g$ assume the position shown in Fig. 3, in which they maintain their interlapping relation, and in this position the plate $i$ oscillates on its shaft in the direction of the examining chamber and engages the idlers $g$, which it then holds in their interlapping relation with the idlers $p$. In this position the shutter $l$ overlies the plate $i$, and engages the idlers $p$ and the free edge of the baffle $r$, the shutter $l$ bearing down on the plate $i$ and holding it against the idlers $g$ to maintain their interlapping relation with the idlers $p$, and, in the event of the fare box being shaken, to impede the separation of the two sets of idlers and instantaneously force the plate $i$ into engagement with the idlers $g$ and cause them to quickly return to their interlapping relation with the idlers $p$. Thus if the fare box should be violently shaken the shutter $l$ has the double effect:—($a$) of impeding the separation of the two sets of idlers and quickly bringing them together again to close the passage $d'$; and ($b$) of moving rapidly into engagement with the baffle $r$, to effectively close the passage between the examining and storage chambers. In this way the shutter $l$ operates as a double check on the return of the fares from the storage chamber to the examining chamber.

For the inspection of the fares, it is advisable to have the platform $d$ well up in the examining chamber and as nearly level as possible, and for the delivery of the fares to the storage chamber to have it incline.

To meet these requirements the platform $d$ is provided with a shaft $e$ journaled either in the sides of the fare box or in a housing $e'$, on which it rocks between a substantially horizontal position, and an inclined position, its free edge $d''$ rising and falling with the change of the fare box position.

To effect these movements a rock shaft $t$ is journaled below the platform $d$ and is fitted with a lever, one of its arms $t'$ having a balance weight $t''$, and its other arm $u$ engaging a crank $u'$ depending from the underside of the platform $d$.

The arm $t'$ and weight $t''$ hang perpendicularly from the shaft $t$ and cause it to rock in its bearings during the movement of the fare box between its upright and inclined positions, the rocking of the shaft $t$ causing the arm $u$ and crank $u'$ to move the platform $d$ to a horizontal position when the fare box is upright and permitting it to move to an inclined position when it is tilted for the delivery of the fares to the storage chamber, the swinging movement of the arm $t'$ and weight $t''$ causing a jarring action of the platform which disturbs the adhesion of fares deposited in the examining chamber and enables them to freely slide off the platform, when the fare box has been tilted for their delivery to the storage chamber, the top surface of the platform being preferably corrugated to obviate the adhesion of the tickets to it. Various changes in the structural details of the trap may be made, within the scope of the claims without departing from the principle of the invention.

Having thus fully described my invention, what I now claim as new and desire to secure by Letters Patent is:

1. In a fare box, an examining chamber, a storage chamber communicating with the examining chamber, and a trap between the examining and storage chambers, comprising two sets of idlers, one set being pivoted to lie across the communication between said chambers and the other pivoted to interlap with those of the first set except during the delivery of the contents of the examining chamber to the storage chamber, and an oscillating support for the first set of idlers.

2. In a fare box, an examining chamber, a storage chamber communicating with the examining chamber, and a trap between the examining and storage chambers, comprising two sets of idlers, one set being pivoted to lie across the communication between said chambers and the other pivoted to interlap with those of the first set except during the delivery of the contents of the examining chamber to the storage chamber, a pivoted baffle for the second set of idlers, an oscillating support for the first set, and a shutter pivotally connected with the oscillating support to engage with the baffle when the fare box is inverted.

3. In a fare box, an examining chamber, a storage chamber communicating with the examining chamber, and a trap, between the examining and storage chambers, comprising a platform extending partly across the examining chamber, a set of idlers pivoted below the platform and projecting beyond its free edge, an oscillating support below said idlers, a set of idlers pivoted to interlap with those of the first set except during the delivery of the contents of the examining chamber to the storage chamber, a pivoted baffle for the second set of idlers and a shutter pivotally connected with the oscillating support to engage with the baffle when the fare box is inverted.

4. In a fare box, an examining chamber, a storage chamber communicating with the examining chamber, and a trap, between the examining and storage chambers, comprising a platform extending partly across the examining chamber, a set of idlers pivoted below the platform and projecting beyond its free edge, an oscillating support below said idlers, a set of idlers pivoted to interlap with those of the first set except during the delivery of the contents of the examining chamber to the storage chamber, a pivoted baffle for the second set of idlers, a shutter pivotally connected with the oscillating support to engage with the baffle when the fare box is inverted, and means to limit the movement of the oscillating support.

5. In a fare box, an examining chamber, a storage chamber communicating with the examining chamber, and a trap between the examining and storage chambers comprising a platform extending partly across the examining chamber, a set of idlers pivoted below the platform and projecting beyond its free edge, an oscillating support below said idlers, a set of idlers pivoted to interlap with those of the first set except during the delivery of the contents of the examining chamber to the storage chamber, a pivoted baffle for the second set of idlers, a shutter pivotally connected with the oscillating support to engage with the baffle when the fare box is inverted, means to limit the movement of the oscillating support and means to limit the movement, in one direction, of the shutter.

6. In a fare box, an automatically operating trap, comprising two sets of idlers, one set pivoted to hang vertically, and the other set pivoted to interlap therewith when the fare box is upright and when it is inverted, and a baffle hinged below the second set of idlers to maintain the interlapping relation with the first set, when the fare box is upright and when it is inverted, and to swing into a position when the fare box is inclined to permit the second set of idlers moving away from the first set.

7. In a fare box, an automatically operating trap comprising two interlapping sets of idlers, a pivoted baffle for one set of idlers and an oscillating support for the other set.

8. In a fare box, an automatically operating trap comprising two interlapping sets of idlers, a pivoted baffle for one set of idlers, an oscillating support for the other set, and a shutter pivoted to the oscillating support to engage with said baffle when the fare box is inverted.

9. In a fare box, an examining chamber, a storage chamber communicating with the examining chamber, and a trap between the examining and storage chambers, comprising a rocking platform extending partly across the examining chamber and movable between an inspection and a delivery position, a set of idlers pivoted below the platform and projecting beyond its free edge, an oscillating support below said idlers, a set of idlers pivoted to interlap with those of the first set except during the delivery of the contents of the examining chamber to the storage chamber, and means for normally maintaining the platform in and restoring it to the inspection position.

10. In a fare box, an examining chamber, a storage chamber communicating with the examining chamber, and a trap between the examining and storage chambers, comprising a rocking platform extending partly across the examining chamber and movable between an inspection and a delivery position, a set of idlers pivoted below the platform and projecting beyond its free edge, an oscillating support below said idlers, a set of idlers pivoted to interlap with those of the first set except during the delivery of the contents of the examining chamber to the storage chamber, and means for normally maintaining the platform in and restoring it to the inspection position, comprising a shaft, an arm connected thereto, and a lever for the shaft normally maintaining the platform in an inspection position except during the delivery of the fares to the storage chamber.

11. In a fare box, an examining chamber, a storage chamber communicating with the examining chamber, and a trap between the examining and storage chambers, comprising a rocking platform extending partly across the examining chamber and movable between an inspection and a delivery position, a set of idlers pivoted below the platform and projecting beyond its free edge, an oscillating support below said idlers, a set of idlers pivoted to interlap with those of the first set except during the delivery of the contents of the examining chamber to the storage chamber, and means for normally maintaining the platform in and restoring it to the inspection position, comprising a shaft and a counter-balanced lever for said shaft, operating to move the platform to and maintain it in an inspection position except during the delivery of the fares to the storage chamber.

12. In a fare box, an examining chamber, a storage chamber communicating with the examining chamber, and a trap between the examining and storage chambers, comprising a rocking platform extending partly across the examining chamber and movable between an inspection and a delivery position, and means for normally maintaining the platform in and restoring it to the inspection position, comprising a shaft and a counter-balanced lever for said shaft, operating to move the platform to and maintain it in an inspection position except during the delivery of the fares to the storage chamber.

13. A fare box comprising an examining chamber, a storage chamber communicating with the examining chamber, and a trap between the examining and storage chambers comprising a rocking platform movable between a horizontal and inclined position, a swinging lever, fulcrumed interjacent its upper and lower extremities, the upper extremity of the said lever adapted to engage the platform and hold it in a horizontal position when the fare box is upright, and a balance weight secured to the other extremity of the lever to cause it to swing relatively to the position of the fare box and release the platform for movement to an inclined position when the fare box is tilted and to bring the platform again to a horizontal position when the fare box is upright.

14. A fare box comprising an examining chamber, a storage chamber communicating with the examining chamber, and a trap between the examining and storage chambers comprising a rocking platform movable between a horizontal and inclined position, a swinging lever, fulcrumed interjacent its upper and lower extremities, the upper extremity of the said lever adapted to engage the platform and hold it in a horizontal position when the fare box is upright, and a balance weight secured to the other extremity of the lever to cause it to swing relatively to the position of the fare box and release the platform for movement to an inclined position when the fare box is tilted and to bring the platform again to a horizontal position when the fare box is upright, in combination with two sets of idlers, one set being pivoted to lie across the communication between said chambers and the other pivoted to interlap with those of the first set except during the delivery of the contents of the examining chamber to the storage chamber.

15. A fare box comprising an examining chamber, a storage chamber communicating with the examining chamber, and a trap between the examining and storage chambers comprising a rocking platform movable between a horizontal and inclined position, a swinging lever, fulcrumed interjacent its upper and lower extremities, the upper extremity of the said lever adapted to engage the platform and hold it in a horizontal position when the fare box is upright, and a balance weight secured to the other extremity of the lever to cause it to swing relatively to the position of the fare box and release the platform for movement to an inclined position when the fare box is tilted and to bring the platform again to a horizontal position when the fare box is upright, in combination with two sets of idlers, one set being pivoted to lie across the communication between said chambers and the other pivoted to interlap with those of the first set except during the delivery of the contents of the examining chamber to the storage chamber, and an oscillating support for the first set of idlers.

16. In a fare box, an examining chamber, a storage chamber below the examining chamber and communicating therewith, and an automatically operating trap comprising two sets of idlers, one set pivoted to hang vertically and the other set to interlap therewith when the fare box is upright and when it is inverted to close the communication between the examining chamber and the storage chamber, in combination with a baffle hinged below the second set of idlers to maintain the interlapping relation with the first set, when the fare box is upright and when it is inverted and to swing into a position when the fare box is inclined to permit the second set of idlers moving away from the first set.

Toronto, September 19, 1918.

WILLIAM COX.

Signed in the presence of—
 M. GILCHRIST,
 CHAS. H. RICHES.